United States Patent [19]

Santi

[11] Patent Number: 5,313,917
[45] Date of Patent: May 24, 1994

[54] SELF-ALIGNING VALVE ASSEMBLY

[75] Inventor: John Santi, West Allis, Wis.

[73] Assignee: Briggs & Stratton Corporation, Wauwatosa, Wis.

[21] Appl. No.: 108,433

[22] Filed: Aug. 18, 1993

[51] Int. Cl.$^5$ ............................ F01L 3/08; F01L 3/10
[52] U.S. Cl. ........................... 123/90.67; 123/188.8; 123/188.9
[58] Field of Search ............... 123/90.28, 90.67, 188.6, 123/188.7, 188.8, 188.9, 188.1, 188.2

[56] References Cited

U.S. PATENT DOCUMENTS

| | | | |
|---|---|---|---|
| 1,512,732 | 10/1924 | Wedlick | 123/188.8 |
| 1,650,644 | 11/1927 | Osterholm | 123/90.51 |
| 1,650,655 | 11/1927 | Rose | 370/5 |
| 1,658,925 | 2/1928 | Jardine | 123/188.3 |
| 1,805,255 | 5/1931 | Osterholm | 123/90.51 |
| 1,826,543 | 10/1931 | Hervig et al. | 123/188.1 |
| 1,826,549 | 10/1931 | Jardine | 29/888.451 |
| 1,842,110 | 1/1932 | Osterholm | 29/888.43 |
| 1,960,709 | 5/1934 | Olenick | 123/188.8 |
| 2,032,906 | 3/1936 | Biewend et al. | 123/90.51 |
| 2,052,862 | 9/1936 | Armstrong | 123/188.1 |
| 2,222,138 | 11/1940 | Burkhardt | 123/90.54 |
| 2,650,579 | 9/1953 | Bernight | 123/90.37 |
| 2,694,391 | 11/1954 | Ohly | 123/188.1 |
| 2,775,232 | 12/1956 | Witzky | 123/90.28 |
| 3,037,494 | 6/1962 | Kirkpatrick et al. | 123/188.1 |
| 3,279,446 | 10/1966 | Rappa | 123/90.51 |
| 3,470,983 | 10/1969 | Briggs | 184/6.9 |
| 4,546,737 | 10/1985 | Kazuoka et al. | 123/188.8 |
| 4,734,968 | 4/1988 | Kuroishi et al. | 123/188.8 |
| 4,779,584 | 10/1988 | Mosler | 123/188.2 |
| 4,787,736 | 11/1988 | Mori et al. | 251/368 |
| 5,148,779 | 9/1992 | Okuse et al. | 123/90.28 |

Primary Examiner—E. Rollins Cross
Assistant Examiner—Weilun Lo
Attorney, Agent, or Firm—Andrus, Sceales, Starke & Sawall

[57] ABSTRACT

The self-aligning valve assembly facilitates proper seating of an engine exhaust valve even though the valve seat is distorted or tilted due to temperature gradients. The valve assembly includes a guide member having a flat surface that slides across a flat surface on the engine block. The guide assembly also includes a return spring and a spring retainer that engages a notch on the valve stem. The spring is disposed between the guide member and the spring retainer. To improve valve closing, the seating surface on the underside of the valve head is preferably convex, while the valve seat is conical. In operation, the compression spring forces proper seating to occur by acting on the retainer which is in turn connected to the valve stem. The guide member slides to reorient the valve stem to the proper position for optimal seating.

13 Claims, 1 Drawing Sheet

SELF-ALIGNING VALVE ASSEMBLY

BACKGROUND OF THE INVENTION

This invention relates to valve assemblies for internal combustion engines. More particularly, this invention relates to so-called "L-Head" valve assemblies for small internal combustion engines.

Increased environmental concerns and regulatory action have caused engine designers to look for new ways to reduce noxious emissions from gasoline-powered internal combustion engines. Specifically, engine designers are attempting to reduce the concentrations of carbon monoxide (CO) and nitrous oxide ($NO_x$) gases that are exhausted from the combustion chamber of the engine.

One cause of noxious emissions is the improper seating, or the delay in proper seating, between the exhaust valve seating surface and the valve seat interconnected with the engine. Any improper seating or delay in proper seating of the exhaust valve will tend to increase the concentrations of unburned fuel and noxious gases that escape from the combustion chamber into the atmosphere. Also, the improper seating or delay in proper seating will tend to increase the amount of noxious crankcase gases which pass from the crankcase to the environment.

One cause of this improper seating is that the valve seat tends to tilt at engine running temperatures due to temperature gradients that exist across the exhaust valve seat. The temperature across the valve seat is greatest on the side of the valve which is closest to the combustion chamber, due to the higher temperatures that exist in the combustion chamber. As the distance increases from the combustion chamber, the temperature across the valve seat tends to decrease. The problem is more acute in L-Head engines due to the close proximity of the exhaust valve to the combustion chamber in such engines when compared to overhead valve (OHV) engines. In addition, the valves of L-Head engines are more difficult to cool than the valves in overhead valve engines due to space limitations.

Whenever the valve seat tilts, some misalignment occurs between the seating surface on the valve head and the valve seat. This misalignment results in improper seating, or a delay in proper seating, of the exhaust valve. Although the explosion forces during the next engine cycle may eventually force the exhaust valve to completely close, the delay in proper closing allows noxious gases to be exhausted into the atmosphere.

Summary of the Invention

A self-aligning valve assembly is disclosed which results in the proper closing of an engine exhaust valve to reduce noxious exhaust emissions. The invention may also be used on an engine intake valve to more precisely control the fuel/air ratio of the intake air stream. The invention has been found to reduce the level of noxious exhaust emissions in a four-cycle, single cylinder L-Head engine by approximately 20 percent.

In a preferred embodiment, the self-aligning valve assembly includes a valve guide aperture formed within the engine block, a block surface on the engine block disposed adjacent to the valve guide aperture, and a valve seat affixed to the engine block. The valve seat also has a longitudinal axis. The valve assembly also includes a poppet-type valve whose valve head has a seating surface that engages the valve seat on the engine block, and a valve stem, having a longitudinal axis, that is at least partially disposed within the valve guide aperture. The valve stem is movable in both a direction parallel to the longitudinal axes of the valve seat and valve stem, and in a direction that is lateral to the longitudinal axes of the valve seat and valve stem.

The valve assembly also includes a guide member that at least partially surrounds the valve stem and that is movable along the block surface in a direction lateral to both the seat's and stem's longitudinal axes when the valve stem also moves in a direction lateral to the longitudinal axes. A retainer, interconnected with a notch on the valve stem, retains a compression spring between the retainer and the guide member. The spring also engages the guide member.

In a preferred embodiment, the guide member is substantially disk-shaped and substantially encircles a portion of the valve stem. The guide member preferably has a substantially flat surface that engages a substantially flat, block surface. The guide member also has a surface opposite to the guide surface that engages the spring. The retainer is disposed on the opposite end of the spring. The connection of the retainer with the valve stem retains the spring in place between the guide member and the retainer.

In operation, any deviation of the valve stem from the longitudinal axis of the valve seat causes the valve stem and the guide member to move in a lateral direction that is non-parallel to the seat's and the stem's longitudinal axes. The spring force against the retainer causes the guide member and the valve stem to laterally move until proper seating occurs between the valve seat and the seating surface on the valve head.

The preferred embodiment also includes a substantially conical valve seat surface, and a substantially convex seating surface on the underside of the valve head. The convex seating surface increases the sealing and speed in re-aligning the valve head with its valve seat when compared to the conically-shaped valve head seating surfaces of prior art valve assemblies.

It is a feature and advantage of the present invention to reduce the carbon monoxide and nitrous oxide emissions from an internal combustion engine.

It is yet another feature and advantage of the present invention to provide a low cost apparatus for automatically aligning a valve head with a valve seat.

These and other features and advantages of the present invention will be apparent to those skilled in the art from the following detailed description of the preferred embodiment and the drawings, in which:

Detailed Description of the Preferred Embodiments

The primary objective of the present invention is to insure proper seating between a seating surface on an engine valve head and a valve seat. When the invention is used with an exhaust valve, noxious emissions are reduced by about 20 percent since the valve properly closes at an earlier time. When the invention is used with an intake valve, the fuel/air ratio in the intake air stream may be more precisely controlled to also increase fuel economy and to minimize the unburned gases.

The present invention is most suitable for use in so-called "L-Head" engines. In such engines, the valve seat tends to become distorted or tilted to varying degrees, depending upon the engine running speed. Since heat generated by the engine increases with engine speed, the degree of tilting of the valve seat also depends upon engine speed.

With the present invention, the seating surface of the valve head, as well as the valve stem itself, are self-aligned to ensure proper valve seating, even though the valve seat has been tilted. Proper seating is achieved at an early point in time with a minimum number of components and at low cost.

Figure 4:
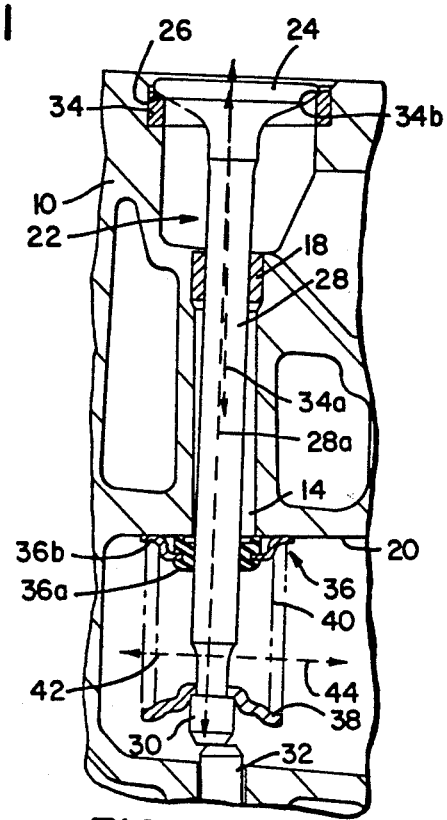
FIG. 4 is a side view, shown in partial section, of a properly-seated exhaust valve even though the valve seat is tilted.
Figure 5:
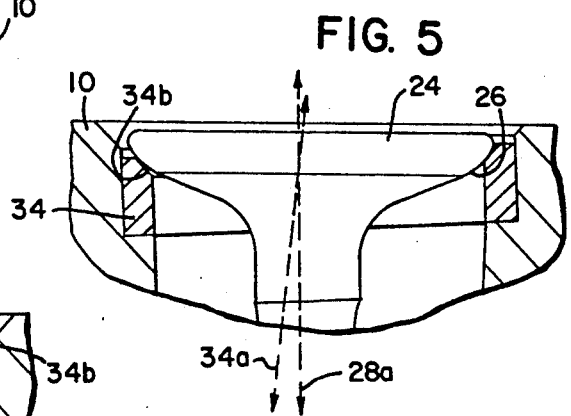
FIG. 5 is an exploded view of the valve head and valve seat of FIG. 4.

The Figures depict a preferred embodiment of the present invention wherein the valve head seating surface is misaligned with the valve seat (FIGS. 1-3), and thereafter when the valve head seating surface is properly self-aligned due to the operation of the present invention (FIGS. 4-5).

Figure 1:
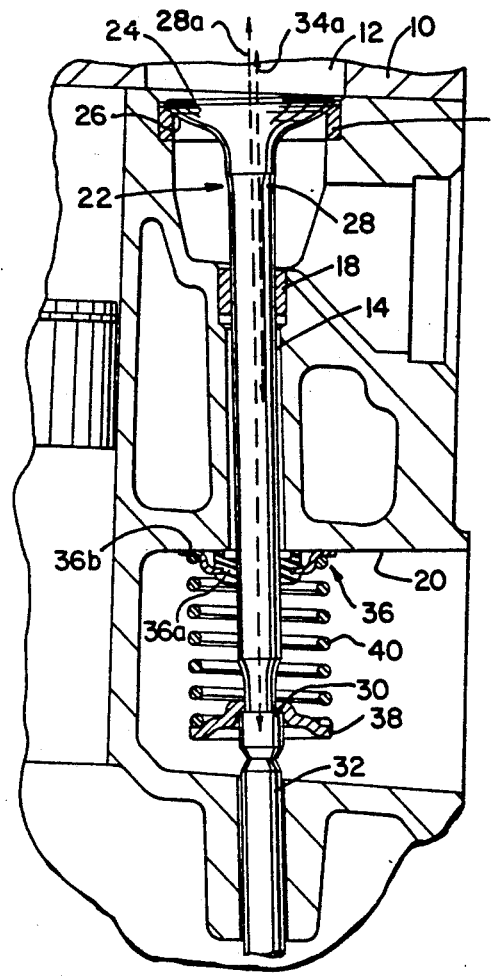
FIG. 1 is a side view, shown in partial section, of the present invention wherein the valve head is misaligned from the valve seat during valve reciprocation.
Figure 2:
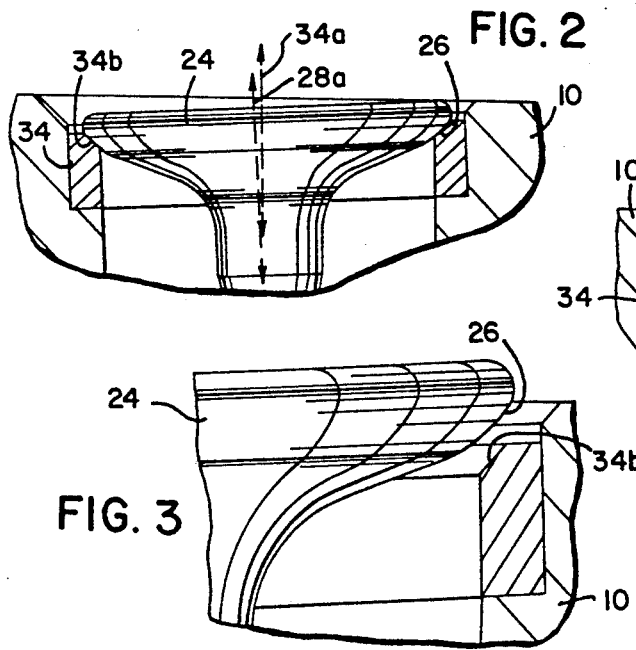
FIG. 2 is an exploded side view that more clearly depicts the tilting of the valve seat at engine running speeds.
Figure 3:
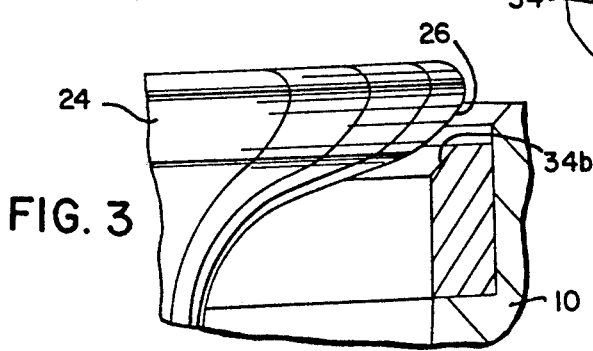
FIG. 3 is an exploded view depicting the shapes of the valve head and the valve seat seating surfaces.

In FIGS. 1-3, an engine block 10 has formed therein a combustion chamber 12 in which fuel is ignited. Engine block 10 also has an elongated aperture 14 that receives a portion of a valve stem 28. A bushing 18 is set in engine block 10 and encircles valve stem 8.

Engine block 10 also includes a substantially flat surface 20 located adjacent to one end of aperture 14. The purpose of surface 20 is discussed below.

The present invention uses a poppet-type valve 22. Valve 22 includes a valve head 24, a seating surface 26 on the underside of valve 24, a valve stem 28 formed integral with valve head 24, and a notch or recess 30 in valve stem 28. Valve stem 28 has a longitudinal axis 28a; valve 22 is designed to reciprocate along axis 28a in response to the movement of a tappet 32. A cam follower (not shown) of tappet 32 follows a cam surface (not shown) to operate valve 22, in a manner that is well known in the art.

A valve seat 34 is interconnected with engine block 10 and is designed to engage seating surface 26. Valve seat 34 has an overall cylindrical shape, and has a longitudinal axis 34a. As depicted in FIGS. 1 and 2, longitudinal axis 28a of valve stem 28 does not coincide with longitudinal axis 34a of valve seat 34 due to the misalignment of the valve seat with respect to the valve stem. This misalignment is due to the tilting of valve seat 34 in response to temperature gradients across the valve seat. The purpose of the present invention is to automatically correct this misalignment.

The self-aligning valve guide assembly of the present invention includes a guide member 36, a spring retainer 38, and a return spring 40. Spring 40 engages both guide member 36 and retainer 38 and is disposed therebetween. Retainer 38 also engages notch 30 of valve stem 28.

Guide member 36 includes a substantially cylindrical flange 36a that at least partially encircles a portion of valve stem 28. Guide member 36 also includes a substantially flat guide surface 36b that is designed to slide or otherwise move across engine block surface 20. Block surface 20 and guide surface 36b are substantially transverse to axes 28c and 34a when the cold engine is not operating.

FIGS. 2 and 3 more particularly depict seating surface 26, the tilted valve seat 34, and valve seat surface 34b that engages seating surface 26. As best seen in FIG. 2, longitudinal axis 34a does not coincide with longitudinal axis 28a, and indeed the axes may intersect when the valve head is misaligned.

FIG. 3 more clearly depicts the shapes of seating surface 26 and of surface 34b. In the preferred embodiment, surface 34b is substantially conical in shape, whereas seating surface 26 is substantially convex in shape. It has been found that these shapes facilitate the alignment and closing of the valve at the earliest time. Prior art valves typically have conical seating surfaces on the underside of the valve head, which do not seat as quickly as conical surface 34b and convex surface 26.

FIGS. 4 and 5 depict the present invention after the alignment of valve 22 has been corrected. As shown in FIGS. 4 and 5, seating surface 26 engages surface 34b of valve seat 34 to close the valve, despite the fact that valve seat 34 is tilted or distorted due to temperature gradients. Proper seating has occurred even though longitudinal axis 28a of valve stem 28 is neither parallel nor coincident with longitudinal axis 34a of valve seat 34. The non-coincidence of the two longitudinal axes is due to the tilting of valve seat 34. The present invention causes valve 22 to thereafter move in a lateral direction that is not parallel to longitudinal axis 34a. This lateral movement enables proper valve seating to occur despite the tilting of valve seat 34. This lateral or side movement is generally depicted by arrows 42 and 44 in FIG. 4.

The self-aligning valve assembly according to the present invention operates in the following manner. When any misalignment occurs between seating surfaces 26 and 34b, the spring force of spring 40 will force seating surfaces 26 and 34b into proper engagement. This proper seating is expedited by the conical shape of surface 34b, and by the convex shape of surface 26.

Spring 40 operates on spring retainer 38 interconnected therewith to cause valve stem 28 to be re-aligned for proper seating. The realignment of valve stem 28 causes guide member 36 to also move in a lateral direction since flange 36a engages valve stem 38. Guide surface 36b moves laterally along engine block surface 20 to reposition the valve stem to the correct position, as depicted in FIG. 4. In this way, the valve head and valve stem are permitted to seek the position that is most conducive to proper seating, in response to the operation of the valve guide assembly.

The valve assembly self-aligns on each engine cycle, so that proper valve seating will occur at an early point even if the tilting of the valve seat increases with engine operating temperature. The primary limitation as to the amount of realignment that is achievable is the clearance between the outer surface of valve stem 28 and the wall which defines aperture 14. In a preferred embodiment, this clearance is 0.020-0.030 inches or greater when the cold engine is at rest.

Although a preferred embodiment of the present invention has been shown and described, alternate embodiments will be apparent to those skilled in the art and are within the intended scope of the present invention.

Therefore, the invention is to be limited only by the following claims.

I claim:

1. A self-aligning valve assembly for an engine valve, comprising:
   an engine block, including
      a valve guide aperture;
      a block surface disposed adjacent to said aperture;
      a valve seat for said valve, said valve seat having a longitudinal axis;
   wherein said valve includes
      a valve head having a seating surface that engages said valve seat;
      a valve stem that is at least partially disposed within said guide aperture, said valve stem being movable in both a direction parallel to said longitudinal axis and in a non-parallel direction to said longitudinal axis;
   a guide member that engages said valve stem and that is movable along said block surface in said non-parallel direction in conjunction with the movement of said valve stem in said non-parallel direction;
   a spring; and a retainer, that retains said spring.

2. The valve assembly of claim 1, wherein said block surface is substantially transverse to said longitudinal axis when the engine is not operating.

3. The valve assembly of claim 1, wherein said block surface is substantially flat, and wherein said guide member has a substantially flat guide surface that moves across said substantially flat block surface when said guide member moves in said non-parallel direction.

4. The valve assembly of claim 1, wherein said guide member includes a disk-shaped portion having an aperture therein that receives said valve stem, and also including a substantially flat guide surface that engages said block surface.

5. The valve assembly of claim 1, wherein said spring is a coil spring that encircles a portion of said valve stem.

6. The valve assembly of claim 1, wherein said valve stem includes a notch, and wherein said retainer is interconnected with said notch.

7. The valve assembly of claim 1, wherein the clearance between said engine block and the portion of said valve stem disposed in said valve guide aperture is at least 0.02 inches when the engine is cold.

8. The valve assembly of claim 1, wherein said valve seat has a valve seat surface that is substantially conical, and wherein said seating surface is substantially convex.

9. A self-aligning valve assembly for an internal combustion engine, comprising:
   a valve seat interconnected with said engine;
   a substantially flat engine surface affixed to said engine;
   a valve, including
      a valve head having a seating surface adapted to engage said valve seat;
      a valve stem, interconnected with said valve head, that reciprocates along a valve stem longitudinal axis and that is movable in a direction lateral to said longitudinal axis;
   a valve stem aperture through which at least a portion of said valve stem passes;
   a valve guide assembly, including
      a spring retainer interconnected with said valve stem;
      a guide member that engages said valve stem and that moves in said lateral direction along with said valve stem, said guide member including a substantially flat guide surface that moves across said engine surface when said guide member moves in said lateral direction; and
      a return spring disposed between said spring retainer and said guide member;
   whereby said valve guide assembly aligns said seating surface with said valve seat to properly close said valve.

10. The valve assembly of claim 9, wherein said guide member has a flange that engages said valve stem.

11. The valve assembly of claim 9, wherein said valve stem has a notch that engages said spring retainer.

12. The valve assembly of claim 9, wherein said seating surface is substantially convex.

13. The valve assembly of claim 12, wherein said valve seat has a substantially conical surface that engages said substantially convex seating surface.

* * * * *